United States Patent
Inoue et al.

(10) Patent No.: US 7,379,458 B2
(45) Date of Patent: May 27, 2008

(54) SERVER LOAD SHARING SYSTEM

(75) Inventors: Rumiko Inoue, Kawasaki (JP); Koichi Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1048 days.

(21) Appl. No.: 10/115,498

(22) Filed: Apr. 3, 2002

(65) Prior Publication Data
US 2003/0108052 A1 Jun. 12, 2003

(30) Foreign Application Priority Data
Dec. 6, 2001 (JP) .............................. 2001-372836

(51) Int. Cl.
*H04L 12/56* (2006.01)
(52) U.S. Cl. .................... 370/392; 370/352; 718/105
(58) Field of Classification Search ................ 370/393; 709/211
See application file for complete search history.

(56) References Cited

U.S. PATENT DOCUMENTS

| | | | |
|---|---|---|---|
| 6,175,874 B1 | 1/2001 | Imai et al. | |
| 6,182,139 B1* | 1/2001 | Brendel ....................... | 709/226 |
| 6,195,680 B1* | 2/2001 | Goldszmidt et al. ......... | 709/203 |
| 6,249,801 B1* | 6/2001 | Zisapel et al. ............... | 718/105 |
| 6,266,335 B1* | 7/2001 | Bhaskaran ................... | 370/399 |
| 6,578,066 B1* | 6/2003 | Logan et al. ................ | 718/105 |
| 6,850,980 B1* | 2/2005 | Gourlay ....................... | 709/226 |
| 6,987,763 B2* | 1/2006 | Rochberger et al. ........ | 370/389 |
| 2002/0129127 A1* | 9/2002 | Romero et al. .............. | 709/220 |
| 2002/0188753 A1* | 12/2002 | Tang et al. .................. | 709/237 |
| 2003/0009559 A1 | 1/2003 | Ikeda | |

FOREIGN PATENT DOCUMENTS

| | | |
|---|---|---|
| JP | 02-222340 | 9/1990 |
| JP | 11-27320 | 1/1999 |
| JP | 2000-138684 | 5/2000 |
| JP | 2003-131961 | 5/2003 |

OTHER PUBLICATIONS

Notice of Reason for Rejection mailed Jul. 18, 2006.
Nikkei Communications, No. 332, p. 124-129, Dec. 18, 2002.
Nikkei Communications, No. 350, p. 120-129, Sep. 17, 2001.
UNIX Magazine, vol. 15, No. 8, p. 57-63, Aug. 2002.

* cited by examiner

*Primary Examiner*—Chi Pham
*Assistant Examiner*—Kevin Mew
(74) *Attorney, Agent, or Firm*—Katten Muching Roseman LLP

(57) ABSTRACT

A server load sharing system having a plurality of server load balancers and a relay device. Each balancer includes a module selecting, any one of a plurality of load sharing target servers specified in their group on the basis of the virtual IP address and each allocated a unique IP address, and a module rewriting a virtual IP address of the received forwarding target packet addressed to the virtual IP address into the unique IP address of the selected server, and rewriting a source IP address of the received packet addressed to the virtual IP address into an IP address capable of specifying the other of the first and second links.

11 Claims, 14 Drawing Sheets

| DESTINATION SERVER IP ADDRESS (VIRTUAL IP ADDRESS) | INFORMATION BEFORE REWRITING DESTINATION PORT NUMBER | CLIENT IP ADDRESS | INFORMATION AFTER REWRITING DESTINATION SERVER IP ADDRESS | DESTINATION PORT NUMBER |
|---|---|---|---|---|
| IpA.1 | 10 | IpC.1 | IpB.3 | 1 |
| IpA.1 | 55 | IpQ.1 | IpB.1 | 2 |
| IpA.1 | 10 | IpZ.4 | IpB.2 | 3 |

SET ADDRESSES AND NUMBERS UNIQUE FOR IDENTIFYING SESSIONS.

540

FIG. 14
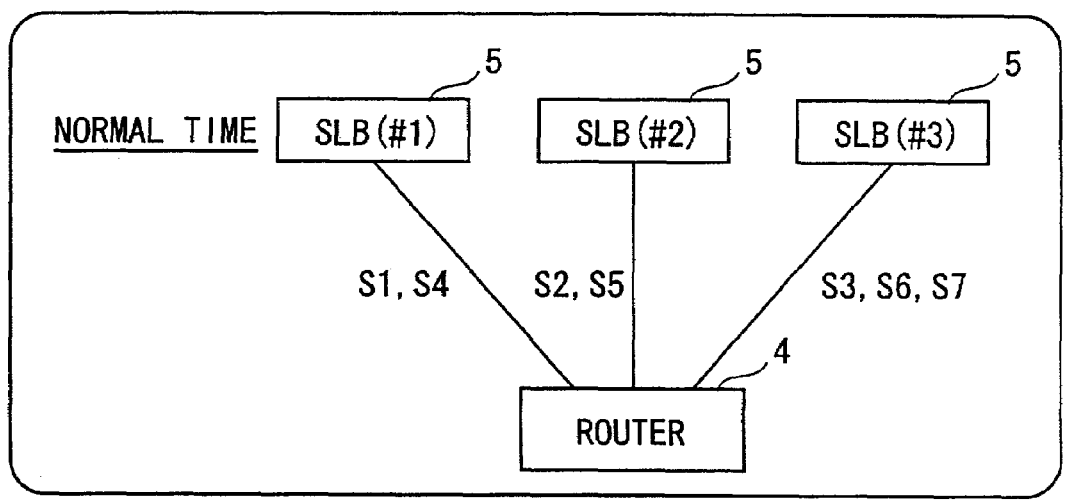
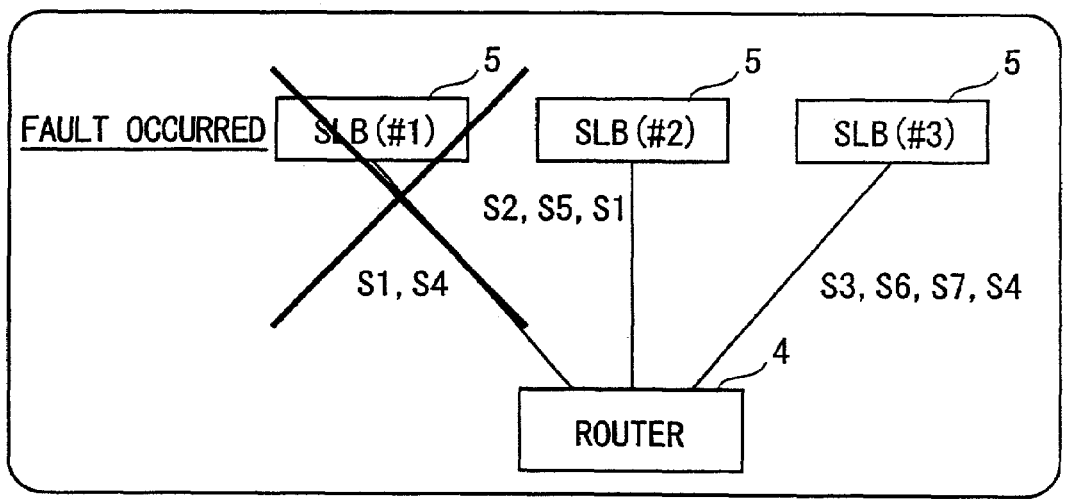
S1~S7:SESSIONS

SERVER LOAD SHARING SYSTEM

BACKGROUND OF THE INVENTION

The present invention relates to a server load sharing system in which server-to-client communications via an IP (Internet Protocol) network such as the Internet or Intranet are performed in a way that keeps load sharing to servers.

A conventional load sharing method is exemplified by multilink PPP (Point-to-Point Protocol) and a multi-cost equal path.

Multilink PPP is defined as a method (see RFC1990) used in ISDN (Integrated Services Digital Network) etc and schemed to, if a line speed is low, provide a plurality of links (physical lines) between adjacent systems and sharing loads to these links. For example, multilink PPP is capable of providing communications having a bandwidth of 128 Kbps (transmission speed) by use of 2B channels (64 Kbps) in ISDN.

Further, the multi-cost equal path is defined as a method of leaving such a plurality of paths as to minimize the cost to the destination in dynamic routing based on a routing protocol and sharing loads among these paths. This multi-cost equal path can be utilized in this way in OSPF (Open Shortest Path First) defined in RFC1247.

These load sharing methods are effective in a case where every packet may go through whatever link.

Yet another conventional load sharing method may be a scheme of sharing the loads to a plurality of servers by making use of at least one server load balancer (a server load sharing device). The server-load-balancer-based server load sharing has a restrain that the packets belonging to the same session must be forwarded via the same link in order for the session not to be disconnected.

FIG. 1 is a diagram showing one example of a first conventional server load sharing system using one server load balancer. Referring to FIG. 1, a server load balancing function of this server load balancer is classified into a load sharing function (L4 (Layer 4) load balancing function) based on categories of protocols equal to or higher than the transport layer in the OSI reference model and a load sharing function (L7 (Layer 7) load balancing function) based on information (L7 information) on the application layer in the OSI reference model.

Namely, the L4 load balancing function is that a forwarding target packet transmitted from a client terminal and received via an IP network (the Internet or Intranet) and an L3 switch is identified based on a category of L4 protocol, i.e., a port number in TCP (Transmission Control Protocol) or UDP (User Datagram Protocol) as an E-mail (POP: Post Office Protocol or SMTP: Simple Mail Transfer Protocol) or as a file transfer (FTP: File Transfer protocol) or as a reference to Web page (HTTP: Hyper Text Transfer Protocol), and this packet is distributed to any one of the plurality of load sharing target servers.

Moreover, the L7 load balancing function is that the forwarding target packet is distributed to any one of the plurality of load sharing target servers according to L7 information such as a response time or URL (Uniform Resource Locator).

The L3 switch serving as a network relay device is defined as a switch or router for connecting the networks to each other at a network layer level in the OSI reference mode.

The first server load sharing system involving the use of one server load balancer is incapable of installing a plurality of server load balancers in terms of the restraint that the restraint should not be disconnected. Accordingly, if a great quantity of packets flow in the server-to-client communications, this server load balancer is inevitable to be a bottleneck to the processing speed.

FIG. 2 shows one example of a second server load sharing system involving the use of a plurality of server load balancers.

The second server load sharing system installs an L4 switch (Layer 4 switch) at a stage anterior to these server load balancers to enable the plurality of server load balancers (1, b) to be provided.

The L4 switch serving as a network relay device is defined as a switch or a gateway for connecting the networks to each other in a way that performs conversions between different categories of protocols ranging from the transport layer (L4) to the application layer (L7) while absorbing a difference between the networks.

Accordingly, this L4 switch uses the L4 load balancing function to distribute the packets to the plurality of server load balancers. In this example, the L4 switch distributes the packet, if the protocol for the forwarding packet is FTP, to the server load balancer (a) and, if the protocol is HTTP, to the server load balancer (b), respectively.

Each server load balancer is capable of distributing the forwarding target packet to any one of the plurality of load sharing target servers by using the L7 load balancing function through the L3 switch.

The second server load sharing system described above is capable of installing the plurality of server load balancers and therefore basically decreasing the possibility that each server load balancer becomes the bottleneck to the processing speed. If a traffic of the packets flowing in the server-to-client communications concentrates depending on the protocol, it is still inevitable that the corresponding server load balancer becomes the bottle neck to the processing speed.

SUMMARY OF THE INVENTION

It is a primary object of the present invention to provide a technology capable of avoiding each of a plurality of server load balancers from becoming a bottleneck to a processing speed of packets in server-to-client communications.

It is another object of the present invention to provide a technology capable of uniformly distributing, even if a traffic of packets in the server-to-client communications concentrates depending on a protocol, the packets to a plurality of load sharing target servers.

To accomplish the above objects, according to one aspect of the present invention, a first server load sharing system has a plurality of server load balancers and a relay device. Each of the plurality of server load balancers accommodates at least first and second links, and includes a module selecting, when receiving a forwarding target packet addressed to a predetermined virtual IP address via one of the first and second links, any one of a plurality of load sharing target servers specified in their group on the basis of this virtual IP address and each allocated a unique IP address, and a module rewriting the virtual IP address of the received forwarding target packet addressed to the virtual IP address into the unique IP address of the selected load sharing target server, and rewriting a source IP address of the received forwarding target packet addressed to the virtual IP address into an IP address capable of specifying the other of the first and second links. The relay device is connected to each of the plurality of server load balancers via the first and second links, and includes a module identifying the received forwarding target packet addressed to the virtual IP address, a module selecting one of the first and second links for forwarding the identified forwarding target packet addressed to the virtual IP address to one of the plurality of server load balancers, and a module forwarding the forwarding target packet received via the other of the first and second links from any one of the plurality of server load balancers to the selected load sharing target server, and forwarding the forwarding target packet sent back from the selected load sharing target server to any one of the plurality of server load balancers via the other of the and second links.

In a second server load sharing system according to the present invention, the selecting module of the relay device may select one of the first and second links for forwarding the packet to any one of the plurality of server load balancers on the basis of a pseudo random number generated by applying a one-way function to a value of the source IP address contained in the identified forwarding target packet addressed to the virtual IP address.

In a third server load sharing system according to the present invention, each of the server load balancers may further include a module rewriting, when receiving the forwarding target packet sent back from the selected load sharing target server via the relay device and the other of the first and second links, the unique IP address of the selected load sharing target server, which is contained in the received forwarding target packet, into the virtual IP address as a source IP address, and further the IP address capable of specifying the other of the first and second links, which is contained in the received forwarding target packet, into the source IP address as a destination IP address that has been contained in the forwarding target packet addressed to the virtual IP address, and making the relay device forward the packet via one of the and second links.

In a fourth server load sharing system according to the present invention, the relay device may further include a module setting the first and second links accommodated in each of the plurality of server load balancers into a group, periodically transmitting a monitoring packet to the first and second links of each group, and ruling out the first and second links as fault links belonging to the group containing the link with no response from selection target links.

In a fifth server load sharing system according to the present invention, the relay device may further include a module setting, in the case of detecting a fault in the first and second links accommodated in each of the plurality of server load balancers, the forwarding target packet distributed to the normal server load balancer accommodating the first and second normal links in a way that keeps this distributed state, and changing the distributed state to the normal server load balancer with respect to only the forwarding target packet distributed to the fault server load balancer accommodating the first and second fault links.

According to another aspect of the present invention, a first server load sharing method, in each of a plurality of server load balancers each accommodating at least first and second links, includes selecting, when receiving a forwarding target packet addressed to a predetermined virtual IP address via one of the first and second links, any one of a plurality of load sharing target servers specified in their group on the basis of this virtual IP address and each allocated a unique IP address, and rewriting the virtual IP address of the received forwarding target packet addressed to the virtual IP address into the unique IP address of the selected load sharing target server, and rewriting a source IP address of the received forwarding target packet addressed to the virtual IP address into an IP address capable of specifying the other of the first and second links. The first server load sharing method, in a relay device connected to each of the plurality of server load balancers via the first and second links, further includes identifying the received forwarding target packet addressed to the virtual IP address, selecting one of the first and second links for forwarding the identified forwarding target packet addressed to the virtual IP address to one of the plurality of server load balancers, and forwarding the forwarding target packet received via the other of the and second links from any one of the plurality of server load balancers to the selected load sharing target server, and forwarding the forwarding target packet sent back from the selected load sharing target server to any one of the plurality of server load balancers via the other of the first and second links.

A second server load sharing method according to the present invention may further include, in the relay device, selecting one of the first and second links for forwarding the packet to any one of the plurality of server load balancers on the basis of a pseudo random number generated by applying a one-way function to a value of the source IP address contained in the identified forwarding target packet addressed to the virtual IP address.

A third server load sharing method according to the present invention may further include, in each of the server load balancers, rewriting, when receiving the forwarding target packet sent back from the selected load sharing target server via the relay device and the other of the first and second links, the unique IP address of the selected load sharing target server, which is contained in the received forwarding target packet, into the virtual IP address as a source IP address, and further the IP address capable of specifying the other of the first and second links, which is contained in the received forwarding target packet, into the source IP address as a destination IP address that has been contained in the forwarding target packet addressed to the virtual IP address, and making the relay device forward the packet via one of the first and second links.

A fourth server load sharing method according to the present invention may further include, in the relay device, setting the first and second links accommodated in each of the plurality of server load balancers into a group, periodically transmitting a monitoring packet to the first and second links of each group, and ruling out the first and second links as fault links belonging to the group containing the link with no response from selection target links.

A fifth server load sharing method according to the present invention may further include, in the relay device, setting, in the case of detecting a fault in the first and second links accommodated in each of the plurality of server load balancers, the forwarding target packet distributed to the normal server load balancer accommodating the first and second normal links in a way that keeps this distributed state, and changing the distributed state to the normal server load balancer with respect to only the forwarding target packet distributed to the fault server load balancer accommodating the first and second fault links.

According to still another aspect of the present invention, a server load sharing device includes a plurality of server load balancing functions of sharing loads to a plurality of servers, wherein one of the server load balancing functions is specified to execute processing on the basis of source identifying information of a packet received from a client terminal.

According to the present invention, each of the plurality of server load balancers can be avoided from becoming a bottleneck to a processing speed of packets in server-toclient communications, and the high-speed communications between the server and the client can be attained.

Moreover, according to the present invention, even if a traffic of packets in the server-to-client communications concentrates depending on a protocol (such as FTP, POP, SMTP, HTTP etc.), the packets can be uniformly distributed to the plurality of load sharing target servers.

Accordingly, the present invention is effective in the Web communications of which an expansion will be accelerated from now on into the future.

Further, according to the present invention, the outgoing and loopback forwarding target packet can flow across the same server load balancer.

Still further, according to the present invention, when the plurality of links are extended between the relay device and each of the server load balancers, the normal communications can not be attained if a fault occurs either in the link across which the outgoing forwarding target packet flows or in the link across which the loopback forwarding target packet flows, and hence this fault can be surely detected.

Moreover, according to the present invention, when the fault occurs in the server load balancer or in the link, the existing session can be made to continue to the greatest possible degree.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 9 is a diagram showing an example of a data structure of a session table of the server load balancer;

FIG. 14 is an explanatory diagram showing a link selecting process when in degenerating and recovering processes in the router.

DETAILED DESCRIPTION OF THE PREFERRED EMBODIMENTS

Next, embodiments of the present invention will hereinafter be described with reference to the accompanying drawings.

[Architecture of Server Load Sharing System]

Figure 1:
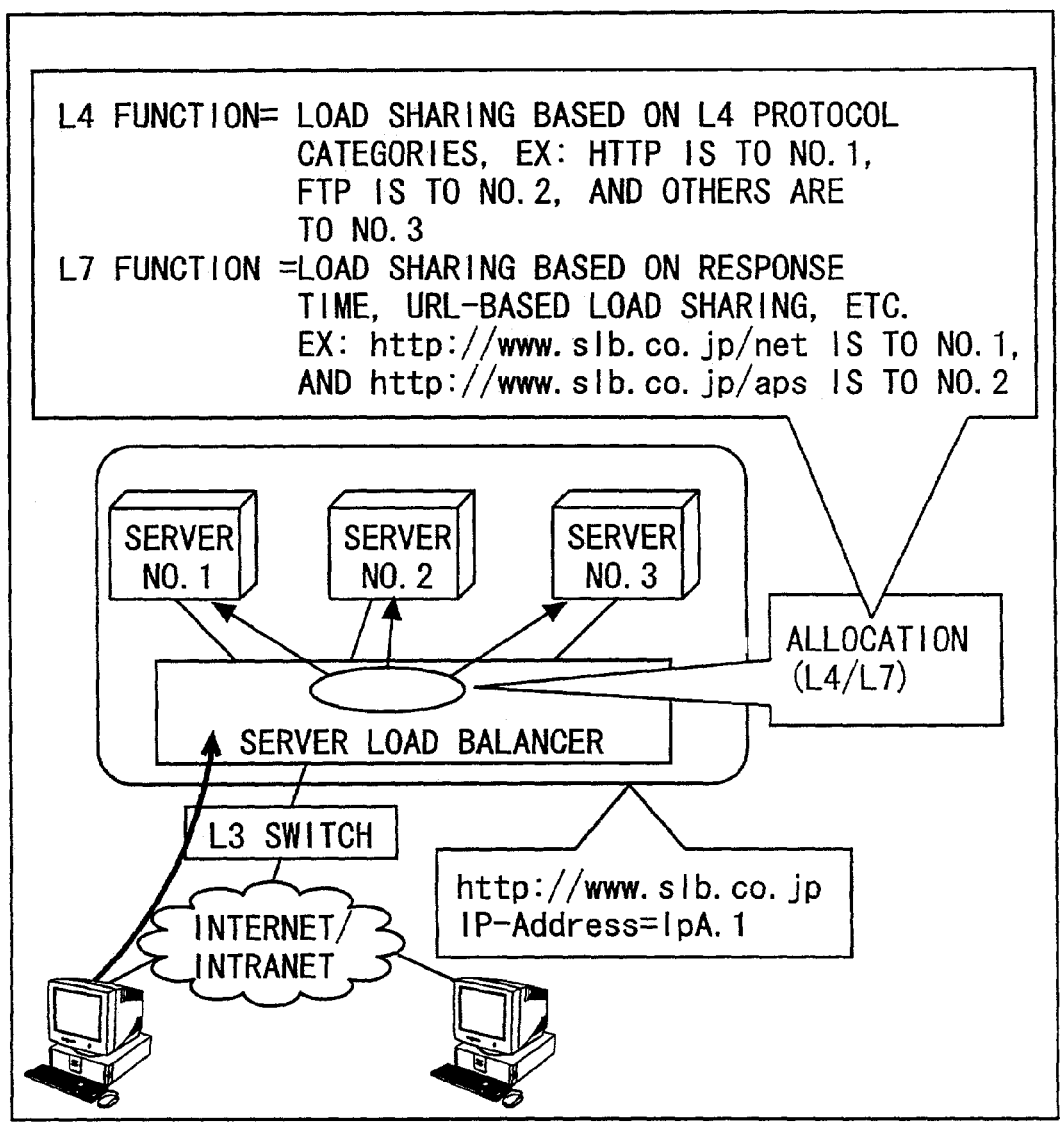
FIG. 1 is a block diagram showing one example of a conventional server load sharing system involving the use of one single server load balancer.
Figure 2:
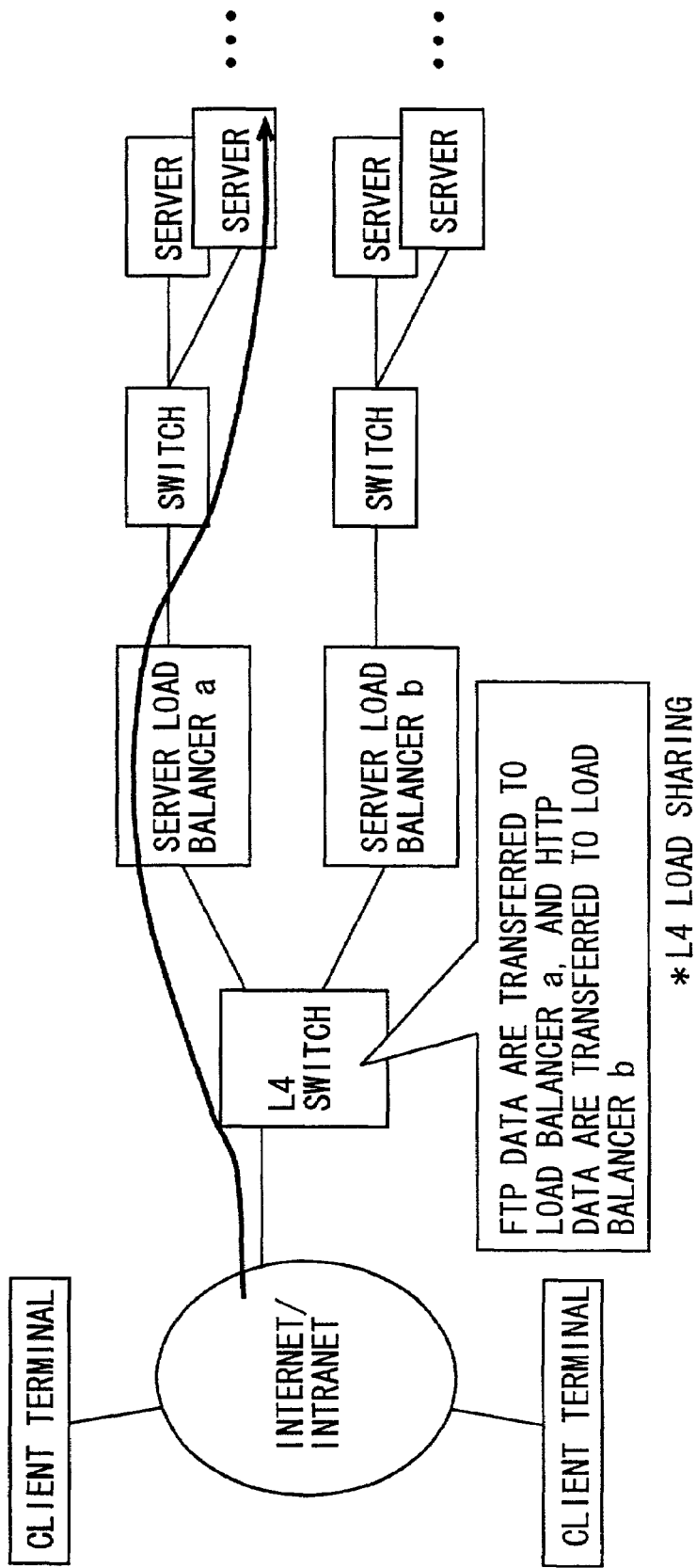
FIG. 2 is a block diagram showing one example of a conventional server load sharing system involving the use of a plurality of server load balancers.
Figure 3:
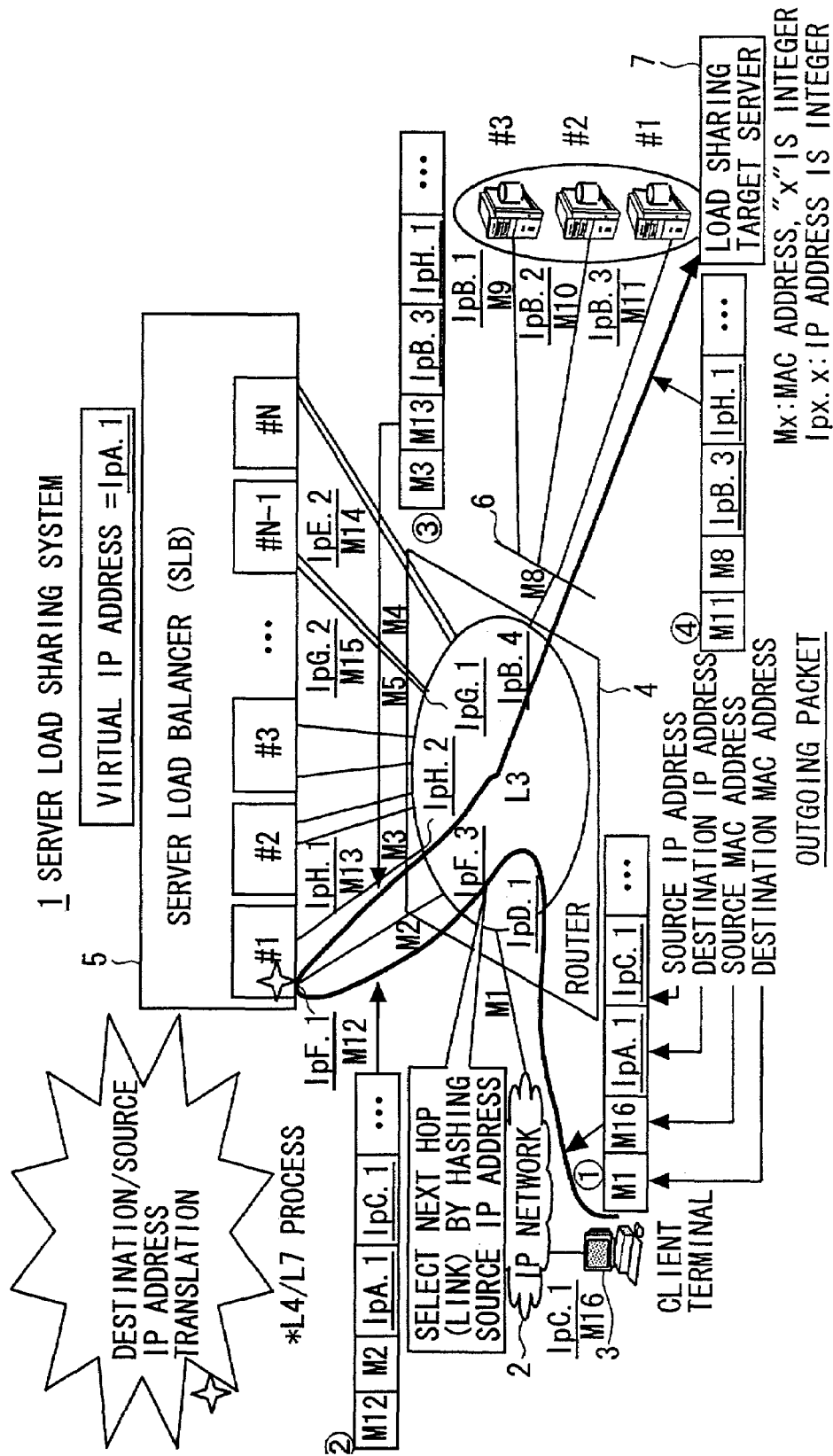
FIG. 3 is a block diagram showing an architecture of a server load sharing system in one embodiment of the present invention as well as showing an outgoing packet flow.
Figure 4:
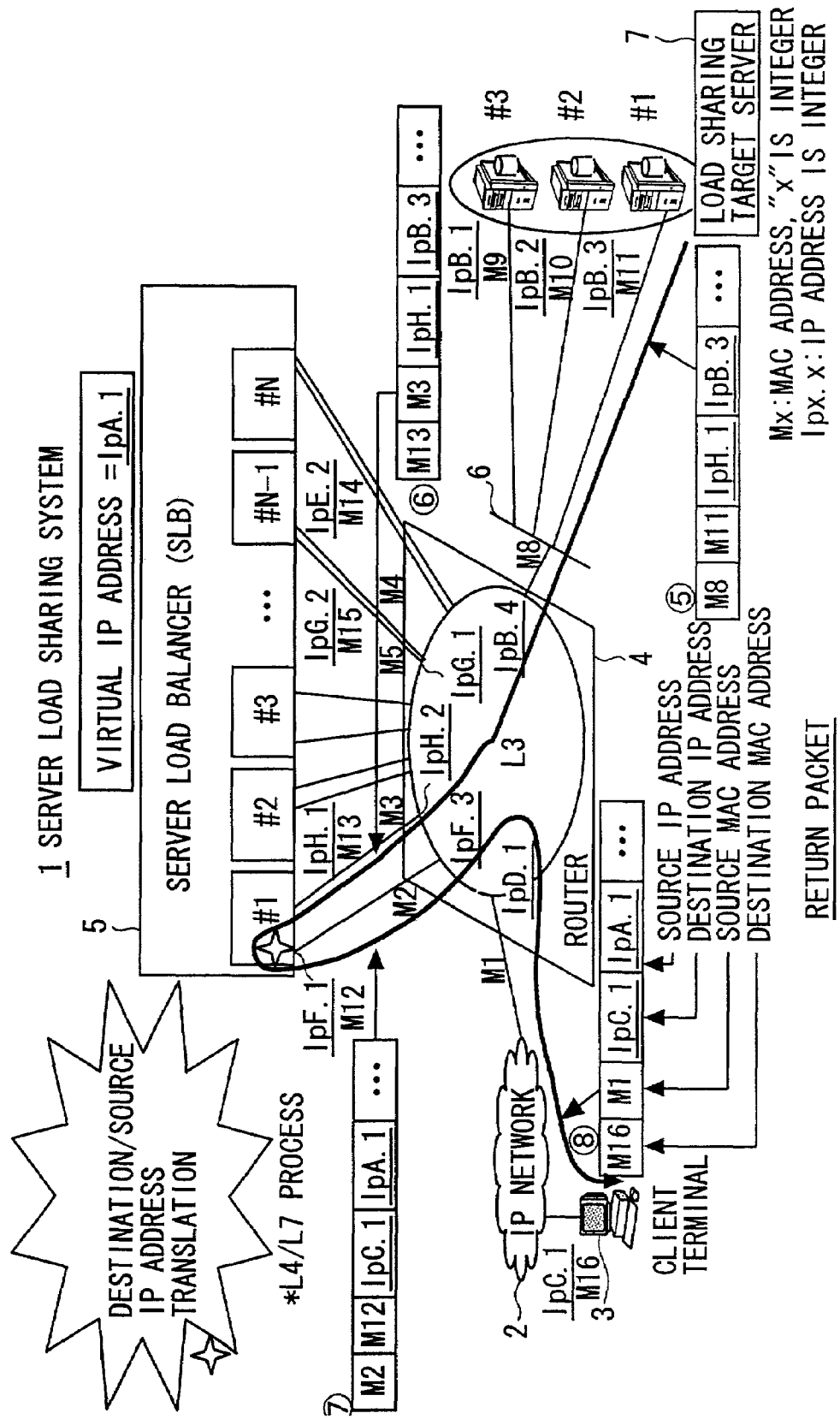
FIG. 4 is a block diagram showing an architecture of a server load sharing system in one embodiment of the present invention as well as showing a return packet flow.

FIGS. 3 and 4 each show an outgoing flow and a returning flow of packets as well as showing an architecture of a server load sharing system 1 in one embodiment of the present invention.

Referring to FIGS. 3 and 4, this server load sharing system 1 includes a plurality of client terminals 3 (one of which is herein illustrated as a representative terminal) such as personal computers connected to an IP network 2 like the Internet or Intranet, routers 4 connected to the IP network 2, a plurality of server load balancers (SLB#1, #2 through #N) 5 connected to the routers 4, and a plurality of servers (#1, #2, #3) 7 defined as a load sharing target server group connected via a LAN (Local Area Network) 6 to the routers 4.

The router 4 categorized as a network relay device can be replaced with an L3 switch that connects the networks to each other at a network layer (L3) level based on the OSI (Open Systems Interconnection) reference model.

Further, the router 4 can be also replaced with an L4 switch serving as a network replay device that connects the networks to each other in a way that performs conversions between different categories of protocols ranging from the transport layer (L4) to the application layer (L7) while absorbing a difference between the networks.

In the LAN 6, the router 4 can be replaced with an L2 switch that connects the networks to each other at a data link layer (L2) in the OSI reference model.

Each server load balancer 5 is connected via a plurality (two or more) of physical links to the router 4. The embodiment of the present invention involves providing the plurality (two or more) of server load balancers 5.

Each server (which may also be termed a load sharing target server) 7 of the load sharing target server group is specified in terms of its group based on a virtual IP address [IpA.1] registered beforehand in the server load balancer 5, and is given a unique IP address. Further, each server 7 is stored with data about at least one category among an E-mail, a file transfer, a reference to a Web page and so on.

Note that the processing of the outgoing packet flow and the return packet flow in this server load sharing system 1 will be discussed later on.

[Router]

Figure 5:
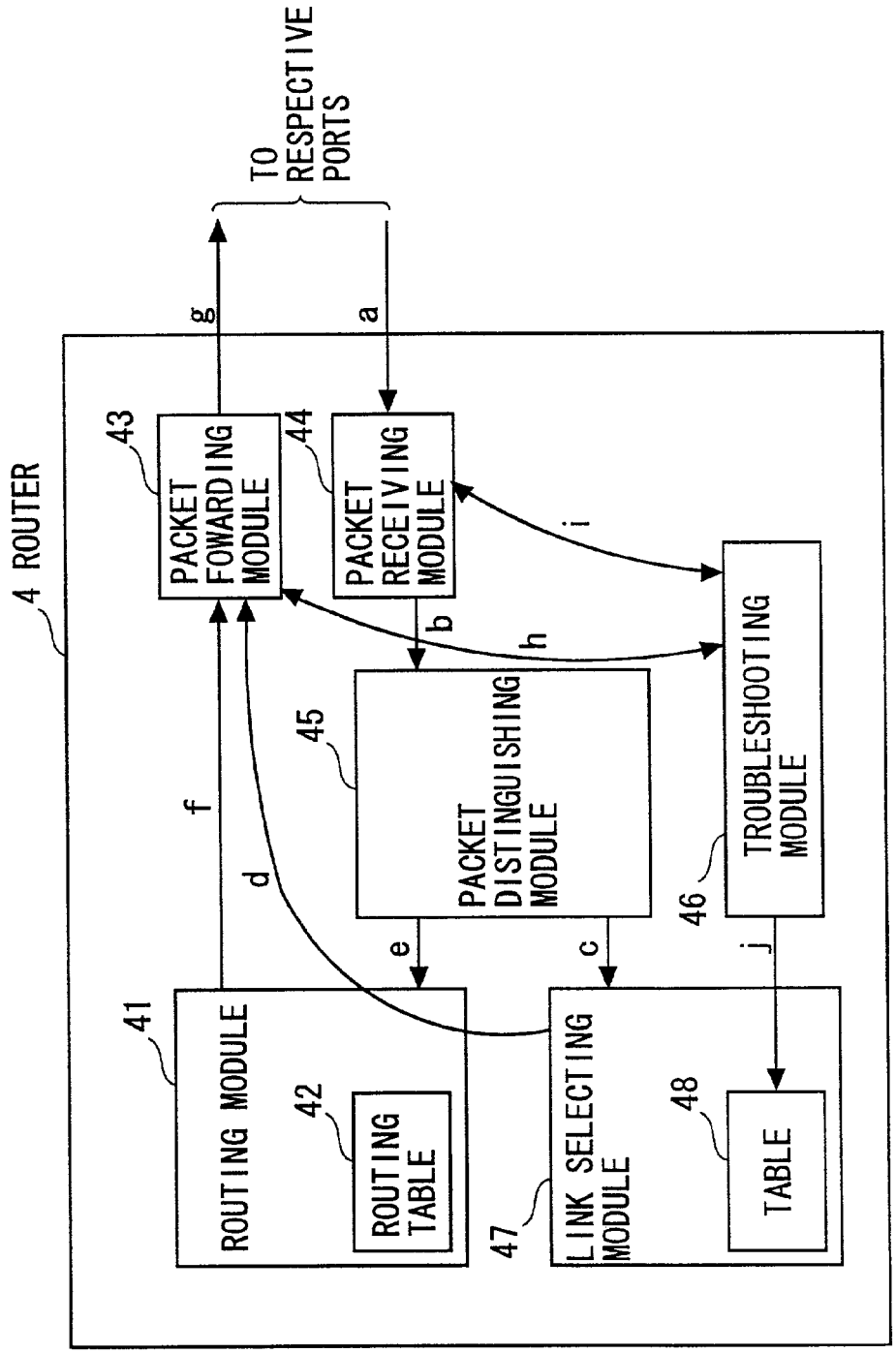
FIG. 5 is a block diagram showing an architecture in detail of a router in FIGS. 3 and 4.

In the server load sharing system 1 illustrated in FIGS. 3 and 4, the router 4 functioning as the load sharing relay device takes an architecture shown in detail in FIG. 5.

The router 4 is, as shown in FIG. 5, constructed of a routing module 41, a packet forwarding module 43, a packet receiving module 44, a packet distinguishing module 45, a troubleshooting module 46 and a link selecting module 47. The routing module 41 has a routing table 42. The link selecting module 47 has a table 48.

The routing module 41 controls normal packet routing. The routing module 41, when receiving a packet from the packet distinguishing module 45 (as indicated by an arrow line e in FIG. 5), selects an interface for forwarding this received packet by referring to the routing table 42 stored with mappings of addresses (IP addresses) to forwarding interfaces (port numbers of the routers 4), and indicates the packet forwarding module 43 to forward the packet (f).

The packet forwarding module 43, in response to the indication given from the routing module 41, executes a packet forwarding process (g). the packet receiving module 44 receives the packet (a). the packet distinguishing module 45, when receiving the packet addressed to the preset virtual IP address [IpA.1] via the packet receiving module 44, transfers this packet to the link selecting module 47 (b, c), and, if not so, transfers the packet to the routing module 41 (b, e).

The link selecting module 47 selects from the table 48 the packet forwarding target server load balancer 5 to which the packet addressed to the virtual IP address and transferred from the packet distinguishing module 45 should be forwarded, and issues a packet forwarding indication to the packet forwarding module 43 (d). The table 48 is previously stored with mappings of the plurality of server load balancers 5 to a plurality of links.

The troubleshooting module 46 periodically sends an ICMP (Internet Control Message Protocol)-ECHO request message to each server load balancer 5 in order to ensure that the link to each server load balancer 5 functions normally, and monitors an ICMP-ECHO response message as a response thereto (h, g, a, I). A result of this monitoring is reflected in the table 48 (j).

The trouble shooting module 46 puts the plurality of links connected to the same server load balancers 5 into a group, and, if the group contains only one link that does not respond within a fixed period of time, judges that all the links belonging to this group fall into a trouble (fault). The troubleshooting module 46, when responses for all the links within this group are sent back, judges that the group is normal.

Figure 6:
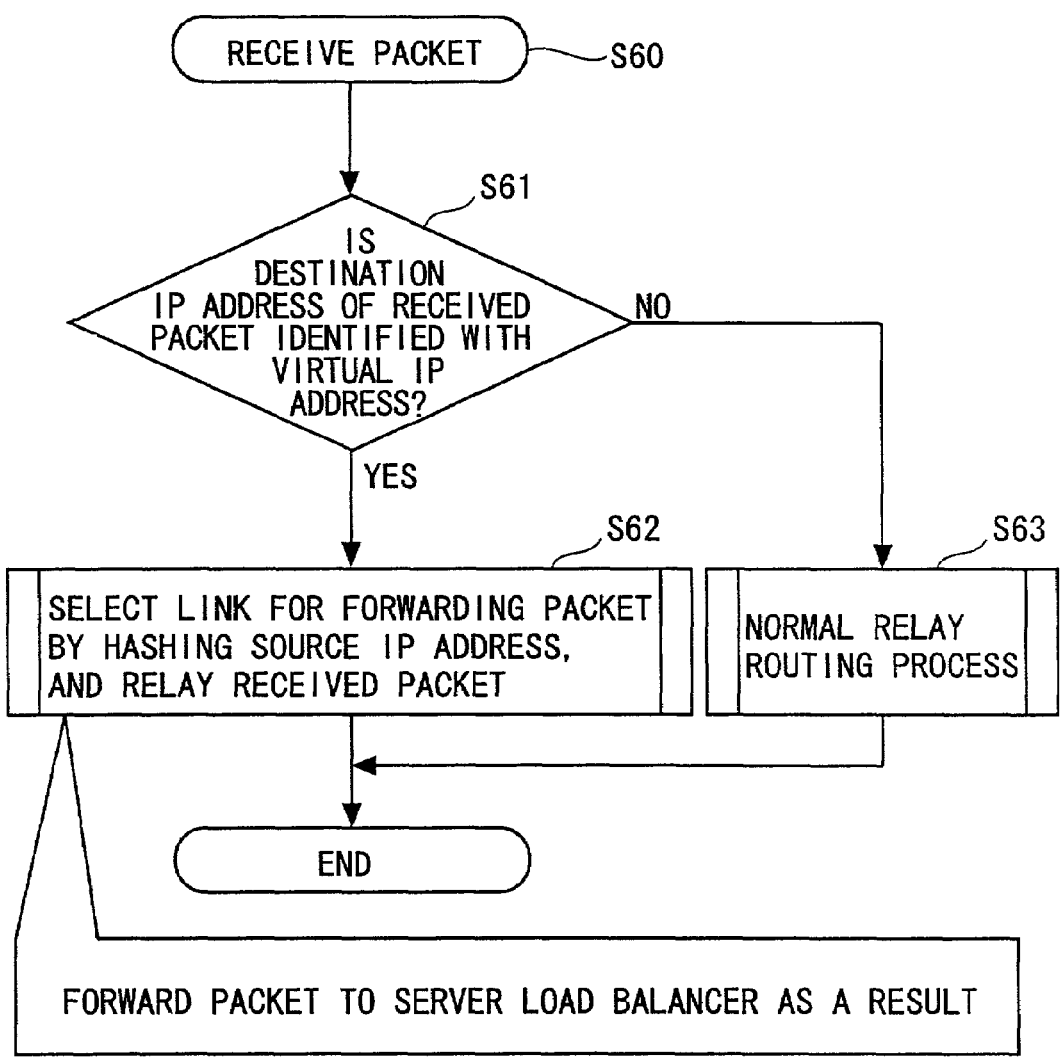
FIG. 6 is a flowchart showing an outline of a packet routing process by the router.

FIG. 6 shows an outline of a packet routing procedure of the router 4. When the packet receiving module 44 of the router 4 taking the architecture described above receives the packet (step S60 in FIG. 6), the packet distinguishing module 45 identifies the received packet.

If the received packet is identified with the packet addressed to the preset virtual IP address, the link selecting module 47 determines which link this packet should be forwarded to based on a specified algorithm (defined as a procedure for selecting one link by hashing (applying a Hash function) a source IP address as will be explained later on) (S61, S62).

In this case, the link selecting module 47 refers to the table 48 and sets only the links with no trouble as selection target links. If the received packet is not identified with the packet addressed to the preset virtual address, the routing module 41 executes the normal routing process (packet routing process) (S61, S63).

The packet forwarding module 43 forwards the packet to the link determined based on the specified algorithm. Whereas if the received packet is identified with the packet addressed to the preset virtual address, this packet if forwarded to the server load balancer 5 corresponding to the determined link, and becomes an element of a load sharing target.

Figure 7:
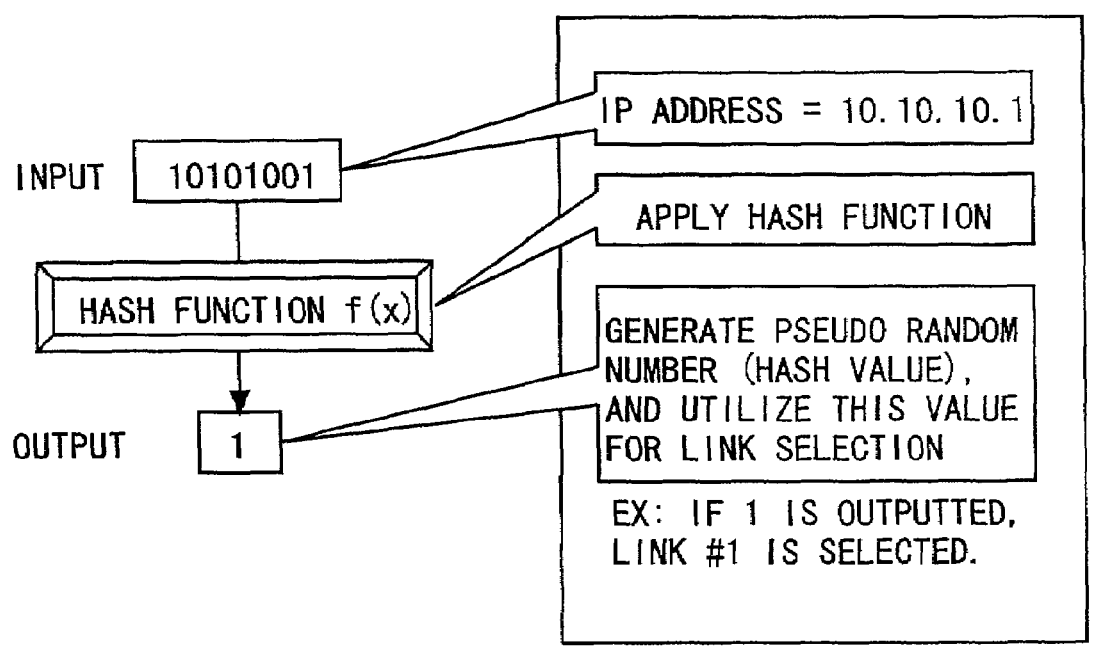
FIG. 7 is an explanatory diagram showing a method of selecting a link by applying a Hash function to a source IP address.

Referring next to FIG. 7, the procedure (which is the specified algorithm described above) for selecting the link by applying the Hash function to the source IP address in the link selecting module 47, will be described.

The link selecting module 47 applies a Hash function f (x) defined as an non-reversible one-way function to a source IP address value, e.g., [10.10.10.1=10101001], of the packet forwarded from the packet distinguishing module 45.

The Hash functions are used as an arithmetic technique for generating a fixed-length pseudo random number (Hash value) from an original text (plain text) inputted, and hence the link selecting module 47 can obtain a Hash value, e.g., [1] as an arithmetic result.

The link selecting module 47 selects one link by making the use of this Hash value [1]. In this case, the link given a link number [1] is selected. Note that the Hash value used for the link selection is preset equal to or smaller than a total number of the selection target links. Further, both of the source IP address and the port number (TCP port number) are set as key information, and the Hash function is applied to the key information, whereby the link may be selected.

[Server Load Balancer]

Figure 8:
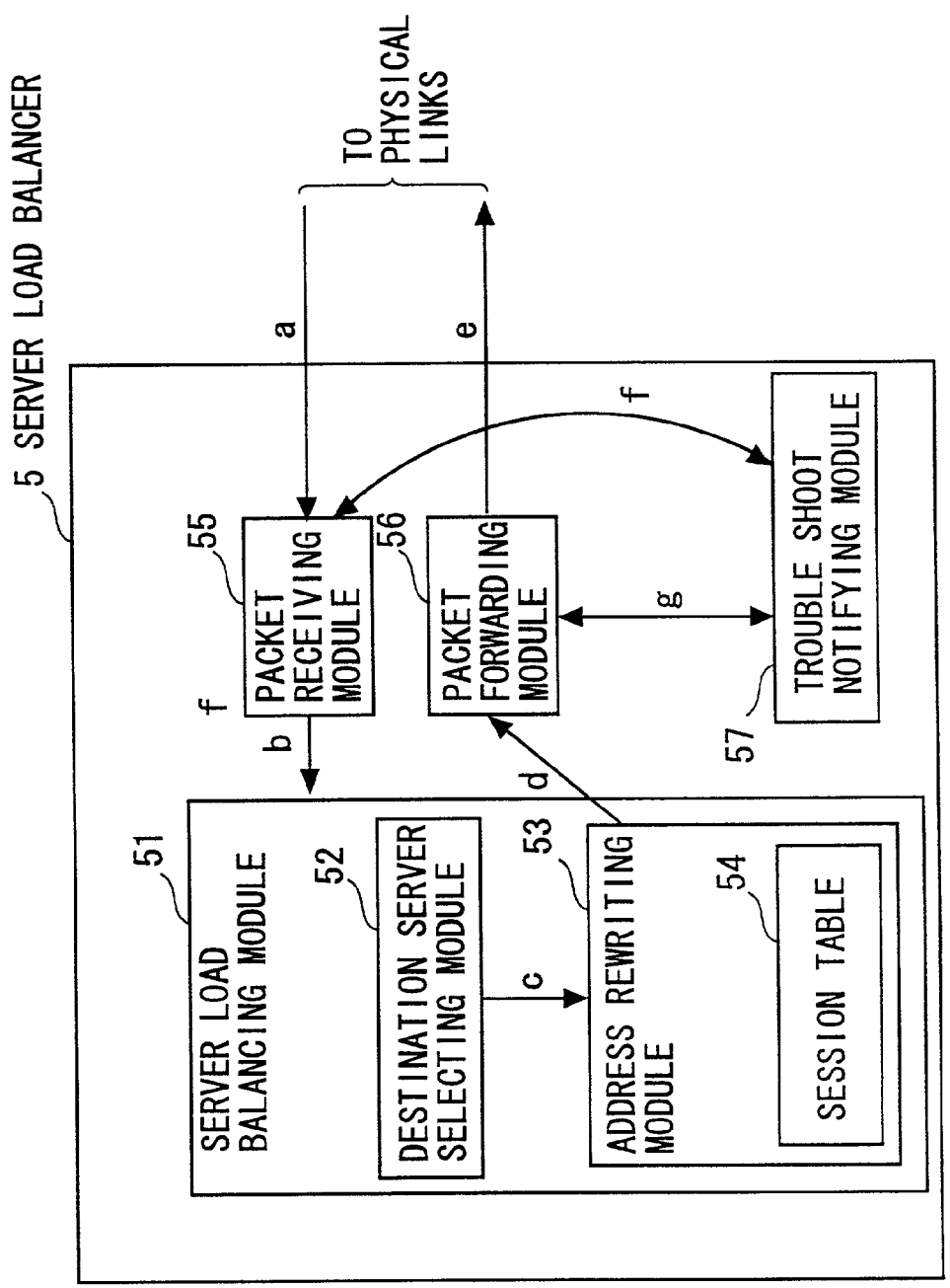
FIG. 8 is a block diagram showing an architecture in detail of a server load balancer in FIGS. 3 and 4.

In the server load sharing system illustrated in FIGS. 3 and 4, each server load balancer 5 takes an architecture fully illustrated in FIGS. 8 and 9.

The server load balancer 5 is, as shown in FIGS. 8 and 9, constructed of a server load balancing module 51, a packet receiving module 55, a packet forwarding module 56 and a troubleshoot notifying module 57. The server load balancing module 51 includes a destination server selecting module 52 and an address rewriting module 53. The address rewriting module 53 has a session table 54.

The server load balancing module 51, when the packet received by the receiving module 55 via the corresponding link (as indicated by arrow lines a and b in FIG. 8) is transferred to the module 51 itself, indicates the destination server selecting module 52 to determine the destination server 7, and indicates the address rewriting module 53 to rewrite the destination IP address of the forwarding target packet (c).

A method by which the destination server selecting module 52 determines the destination server 7 basically involves (1) load sharing (L4 load balancing) based on categories of the protocols (POP (Post Office Protocol), SMTP (Simple Mail Transfer Protocol), FTP (File Transfer Protocol), HTTP (HyperText Transfer Protocol) higher than the transport layer in the OSI reference model, and (2) load sharing (L7 load balancing) based on information (L' information such as a response time or URL) on the application layer in the OSI reference model.

Further, the destination server selecting module 52 may adopt, as the methods of determining the destination server 7, methods such as a round-robin system, a minimum connection count system and a static weighting method in addition to the method of selecting one server with a small load among the plurality of servers 7 by measuring the loads of these servers 7, and the method of selecting one server 7 among the plurality of servers 7, corresponding to an IP address of the client terminal 3.

The address rewriting module 53 further rewrites the source IP address of the forwarding target packet into an IP address of the server load balancer 5 (c). Moreover, the address rewriting module 53 sets mappings of the original information before being rewritten to the information after being rewritten (c).

The packet receiving module 55 receives the packet (a, b, f), and the packet forwarding module 56 forwards the packet (d, g, e). The troubleshoot notifying module 57 receives a packet (ICMP-ECHO request message) for monitoring a link fault from the packet receiving module 55, and, if no fault occurs, sends a response (ICMP-ECHO response message) back via the packet forwarding module 56. Note that if the fault occurs, no response is sent back (a, f, g, e).

Figure 10:
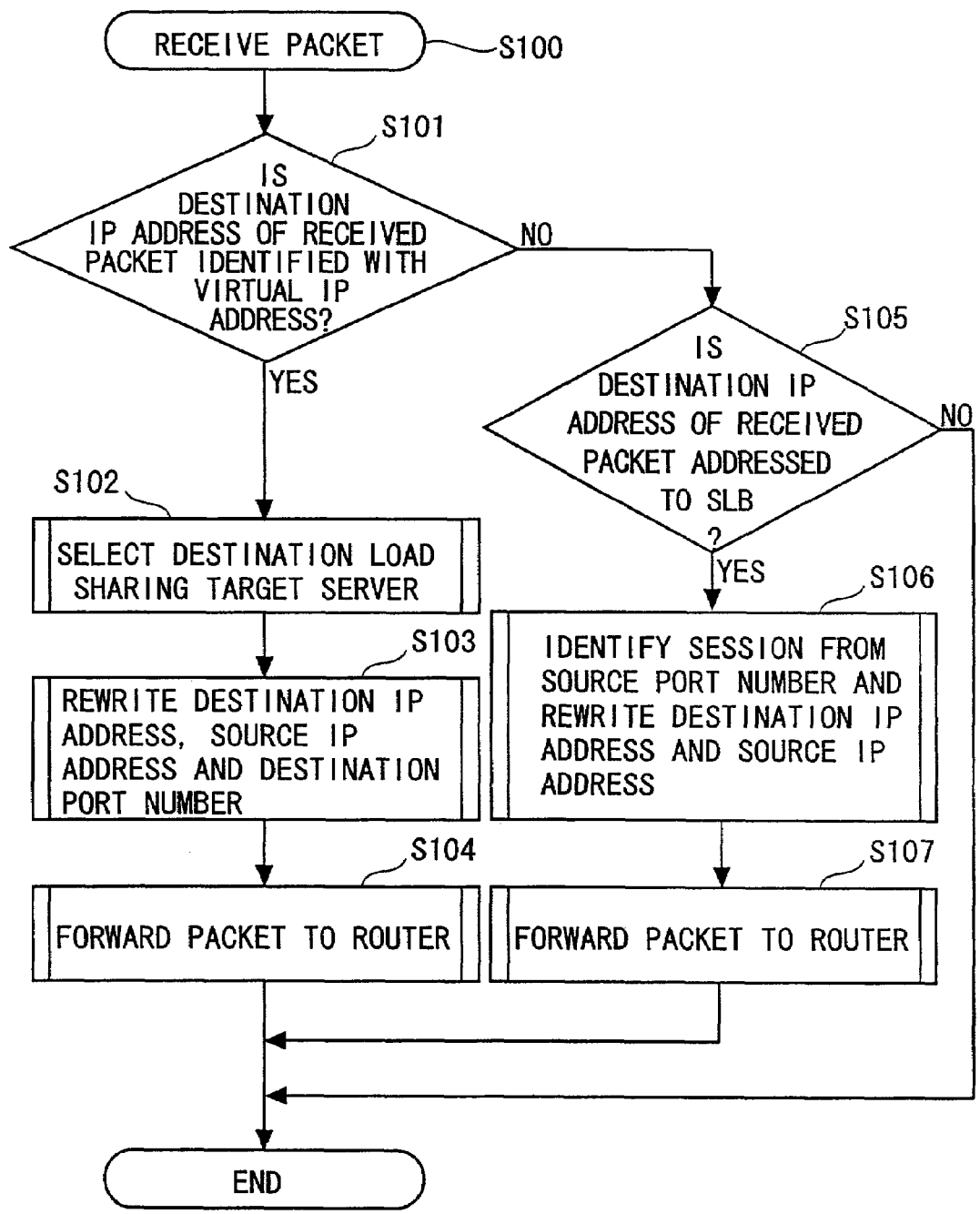
FIG. 10 is a flowchart showing an outline of a processing procedure in the server load balancer.

FIG. 10 shows an outline of a processing procedure in each server load balancer 5. The server load balancer 5, when receiving the forwarding a target packet from the router 4 (step S100 in FIG. 10), indicates the server load balancing module 51 judges whether a destination IP address of this packet is identified with a virtual IP address (S101).

If identified with the virtual IP address, the server load balancing module 51 executes a server load balancing process with respect to the outgoing packet (S102, S103).

The server load balancing process with respect to the outgoing packet involves (1) a process (S102) of determining a destination of his packet, i.e., an IP address of the load sharing target server 7 and a port number of the load sharing target server 7, (2) a process (S103) of rewriting the destination IP address of the forwarding target packet into an IP address of the already-determined server 7 and rewriting the port number into a determination value, and (3) a process (S103) of rewriting the source IP address of the forwarding target packet into an IP address of the server load balancer 5 to which the packet is to be forwarded.

The server load balancing module 51 stores the session table 54 with mappings between results of these processes (the mappings of pieces of information before being rewritten to pieces of information after being rewritten). Note that if the received forwarding target packet has already been registered in the session table 54, the IP address of the destination server 7 registered and the port number of the destination server 7 registered, are determined for use.

After the server load balancing process has been executed by the server load balancing module 51, the packet forwarding module 55 forwards the forwarding target packet to the router 4 via the rest of corresponding links (S104).

If not identified with the virtual IP address in S101, the server load balancing module 51 judges whether the destination IP address of the received forwarding target packet is addressed to the server load balancer 5 (S105).

If the destination IP address is addressed to the server load balancer 5, the server load balancing module 51 executes a converting process with respect to a loopback (return) packet from the load sharing target server 7 (S106).

Note that if the destination IP address is not addressed to the server load balancer 5, the forwarding target packet is defined as a packet for monitoring the link fault, and hence the server load balancing module 51 dose not execute any process.

The converting process with respect to the loopback packet involves (1) a process in which the destination server selecting module 52 identifies a session on the basis of a source port number (recorded as a destination port number in the session table 54) of the forwarding target packet by referring to the session table 54 retained by the address rewriting module 53, and (2) a process in which the address rewriting module 53 rewrites the destination IP address and the source IP address of the forwarding target packet by referring to the session table 54.

After the converting process has been executed by the server load balancing module 51, the packet forwarding module 55 forwards the forwarding target packet to the router 4 via the rest of corresponding links (S107).

If the troubleshooting module 46 of the router 4 transmits the link fault monitoring packet to the server load balancer 5, the troubleshoot notifying module 57 in the server load balancer 5 receives this link fault monitoring packet via the packet receiving module 55, and, if normal (when receiving the ICMP-ECHO request message), sends a response (ICMP-ECHO response message) back via the packet forwarding module 56.

[Operation of Server Load Sharing System]

Next, a variety of examples of the operation of the server load sharing system 1 described above will be explained.

[1] Process of Outgoing Packet

Figure 11:
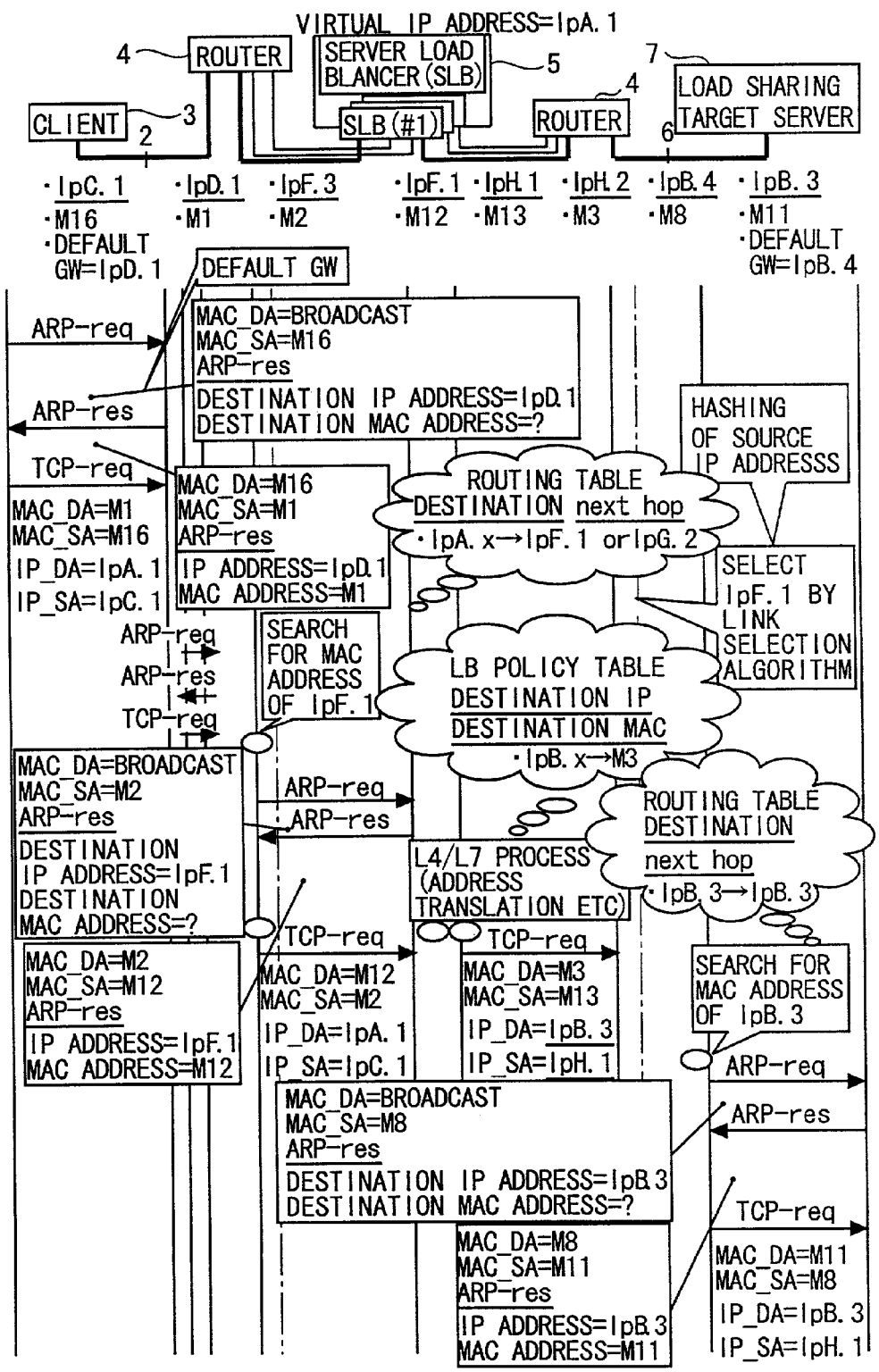
FIG. 11 is an explanatory diagram showing an outgoing packet process in the server load sharing system shown in FIG. 3.

Referring first to FIGS. 3 and 11, a process with respect to the outgoing packet to the load sharing target server 7 from the client terminal 3 in the server load sharing system 1, will be discussed.

The client terminal 3 connected to the IP network 2, when accessing the load sharing target server 7, sends a packet (a first packet) having a virtual IP address (which is herein IpA.1).

The first packet (a TCP request message) has a header field and a data field, wherein the header field contains a source IP address "IP-SA[IpC.1]", a destination IP address "IP-DA[IpA.1]", a source MAC address "MAC-SA[M16]" and a destination MAC address "MAC-DA[M1]".

The destination MAC address "MAC-DA[M1]" in the first packet is obtained in such a way that the client terminal 3 and the router 4 send and receive an ARP (Address Resolution Protocol) request message and an ARP response message.

Namely, ARP is defined as a protocol for automatically translating the IP address into the MAC address, wherein when the client terminal 3 broadcasts the ARP request message specifying an IP address of the destination to the routers 4, the router corresponding to this specified IP address sends back to the client terminal 3 an ARP response message containing a couple of the MAC address and the IP address.

The router 4, when receiving the first packet containing the destination IP address "IP-DA" that indicates the previously set (preset) virtual IP address "[IpA.1]", selects one of the plurality of normally operable target links, and forwards a second packet to the server load balancer (SLB#1) 5 via the selected link.

The second packet (TCP request message) has a header field and a data field, wherein the header fields contains a source IP address "IP-SA[IpC.1]", a destination IP address "IP-DA[IpA.1], a source MAC address "MAC-SA[M2]" and a destination MAC address "MAC-DA[M12]".

The destination MAC address "MAC-DA[M12]", in the second packet is obtained in such a way that the router 4 and the server load balancer (#1) 5 send and receive an ARP request message and an ARP response message.

The links selectable as the target links are preset and identified based on the IP addresses of the server load balancers 5.

The link can be selected by the router 4 in a way that applies the Hash function to the source IP address "IP-SA [IpC.1]" of the first forwarding target packet received.

The server load balancer (#1) 5, when receiving the second packet of which the destination IP address "IP-DA" indicates the virtual IP address via one selected link among the links accommodated in this balancer 5 itself, determines the load sharing target server 7 that should actually process the packet, and also determines a port number of the load sharing target server 7 in order to identify a session.

Next, the server load balancer 5 transmits to the router 4 a third packet assembled by padding, to the data field of the second packet received, a header field in which to translate (1) the destination IP address "IP-DA[IpA.1]" of the second packet received into an IP address [IpB.3] of the already-determined load sharing target server 7, (2) a destination port number value [10] of the second packet into an already-determined port number value [1], (3) the source IP address "IP-SA[IpC.1]" of the second packet into a self-device IP address, i.e., an IP address [IpH.1] corresponding to the server load balancer 5 accommodating the link to which the packet is actually forwarded, (4) the destination MAC address "MAC-DA[M12]" of the second packet into a MAC address [M3] of the router 4, and (5) the source MAC address "MAC-SA[M2]" of the second packet into a self-device MAC address [M13].

Herein, the MAC address [M3] of the router 4 is obtained based on a policy table (unillustrated) in which to predefine mappings of the MAC addresses to the IP addresses of the load sharing target servers 7.

The third packet (TCP request message) has a header field and a data field, wherein the header field contains a source IP address "IP-SA[IpH.1]", a destination IP address "IP-DA [IpB.3]", a source MAC address "MAC-SA[M13]" and a destination MAC address "MAC-DA[M3]".

Further, the server load balancer 5 records the destination port numbers and the IP addresses before and after the address translation in the session table 54 (see the numeral 540 in FIG. 9).

The router 4 determines a destination from the destination IP address "IP-DA" of the third packet received via the link from the server load balancer 5, then translates the source MAC address "MAC-SA" and the destination MAC address "MAC-DA" in the header field, and relays (forwards) this packet as a fourth packet to the load sharing target server (#1) 7.

The fourth packet (TCP request message) has a header field and a data field, wherein the header field contains a source IP address "IP-SA[IpH.1]", a destination IP address "IP-DA[IpB.3]", a source MAC address "MAC-SA[M8]" and a destination MAC address "MAC-DA[M11]".

The destination MAC address "MAC-DA[M11]" in the fourth packet is obtained in such a way that the router 4 and the load sharing target server (#1) 7 send and receive an ARP request message and an ARP response message.

The specified load sharing target server (#1) 7, after receiving via the LAN 6 the fourth packet forwarded from the router 4 and executing a predetermined process on the same fourth packet, assembles a response packet to the client terminal 3.

[2] Process of Loopback (Return) Packet

Figure 12:
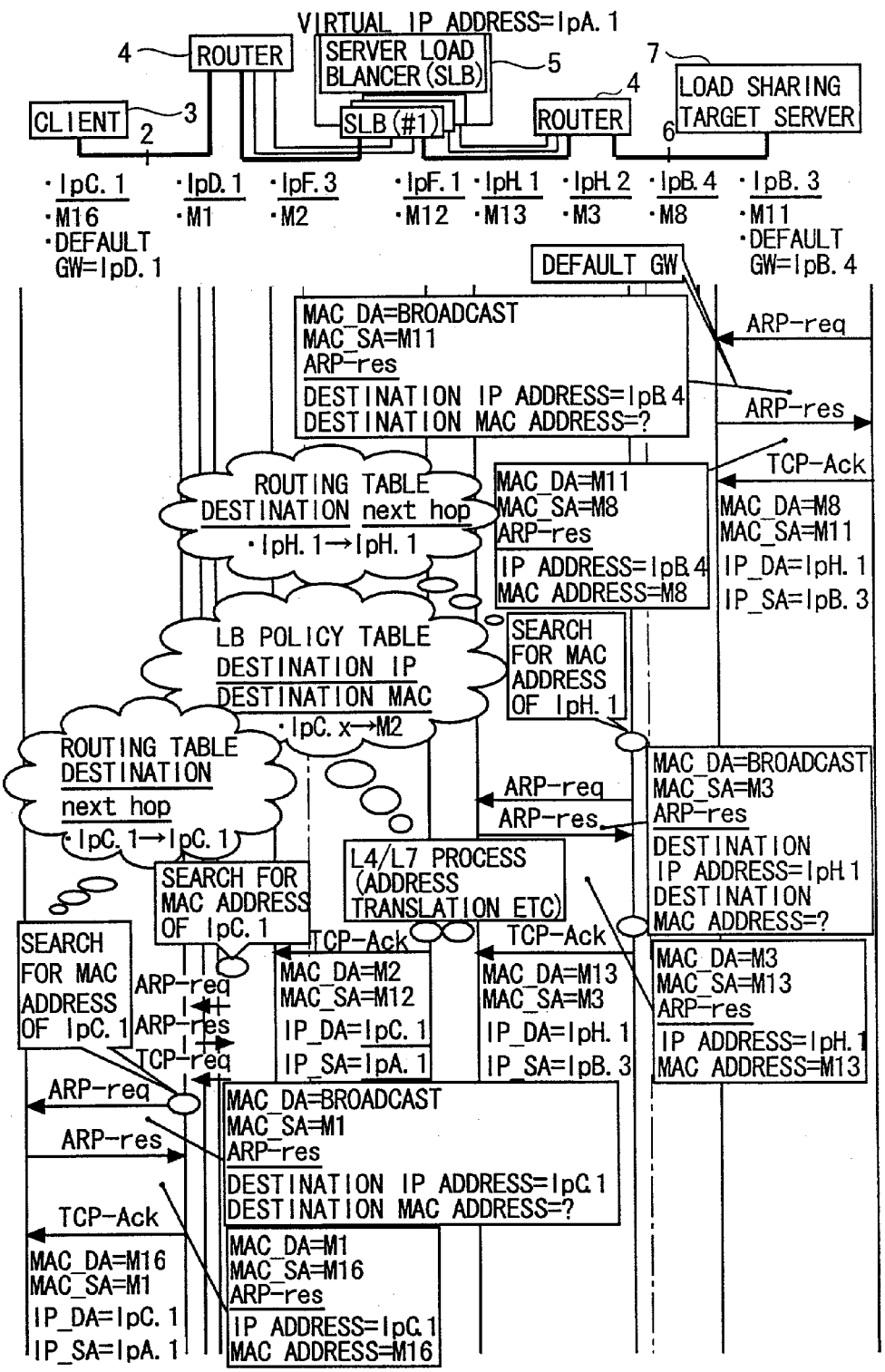
FIG. 12 is an explanatory diagram showing a loopback packet process in the server load sharing system shown in FIG. 4.

Referring next to FIGS. 4 and 12, a process of a loopback (return) packet addressed to the client terminal 3 from the load sharing target server (#1) 7 in the server load sharing system 1, will be explained.

The load sharing target server (#1) 7 sends as a fifth packet the thus assembled response packet addressed to the client terminal 3 (which is addressed precisely to the server load balancer (SLB#1) 5) via the LAN 6.

The fifth packet (TCP response message) has a header field and a data field, wherein the header field contains a source IP address "IP-SA[IpB.3]", a destination IP address "IP-DA[IpH.1]", a source MAC address "MAC-SA[M11]" and a destination MAC address "MAC-DA[M8]".

The destination MAC address "MAC-DA[M8]" in the fifth packet is obtained in such a way that the router 4 and the load sharing target server (#1) 7 send and receive an ARP request message and an ARP response message.

The router 4, when receiving the fifth packet via the LAN 6 from the load sharing target server 7, determines a link on the basis of the destination IP address "IP-DA", then translates the source MAC address "MAC-SA" and the destination MAC address "MAC-DA" in the header field, and forwards this packet as a sixth packet to the server load balancer 5.

The sixth packet (TCP request message) has a header field and a data field, wherein the header field contains a source IP address "IP-SA[IpB.3]", a destination IP address "IP-DA [IpH.1]", a source MAC address "MAC-SA[M3]" and a destination MAC address "MAC-DA[M13]".

The destination MAC address "MAC-DA[M13]" in the sixth packet is obtained in such a way that the router 4 and the server load balancer (#1) 5 send and receive an ARP request message and an ARP response message.

In this case, the destination IP address "IP-DA" indicates the IP address of the server load balancer (#1) 5, and therefore the sixth packet is forwarded to the corresponding link.

The server load balancer (#1) 5, when receiving the sixth packet as a loopback packet, checks the session table 54 (see the numeral 540 in FIG. 9), and translates (1) the destination IP address "IP-DA" into an IP address [IpC.1] of the client terminal 3 in that session, (2) the source IP address "IP-SA" into a virtual IP address [IpA.1] in that session, and (3) the destination port number value [1] into a port number value [10], respectively.

Further, the server load balancer 5 translates (4) the destination MAC address "MAC-DA[M13]" of the sixth packet received into a MAC address [M2] of the router 4, and (5) the source MAC address "MAC-SA[M3]" of the sixth packet into a self-device MAC address [M12], respectively.

Herein, the MAC address [M2] of the router 4 is obtained based on the policy table in which to predefine the mappings of the IP addresses to the MAC addresses of the routers 4.

Then, the server load balancer 5 transmits to the router 4 a seventh packet assembled by padding the address-translated header field to the data field in the sixth packet.

The seventh packet (TCP response message) has a header field and a data field, wherein the header field contains a source IP address "IP-SA[IpA.1]", a destination IP address "IP-DA[IpC.3]", a source MAC address "MAC-SA[M12]" and a destination MAC address "MAC-DA[M2]".

The router 4 determines a destination from the destination IP address "IP-DA[IpC.1]" in the seventh packet received, and forwards to the IP network 2 an eighth packet with the destination MAC address "MAC-DA" and the source MAC address "MAC-SA" translated.

The eighth packet (TCP response message) has a header field and a data field, wherein the header field contains a source IP address "IP-SA[IpA.1]", a destination IP address "IP-DA[IpC.3]", a source MAC address "MAC-SA[M1]" and a destination MAC address "MAC-DA[M16]".

The destination MAC address "MAC-DA [M16]" in the eighth packet is obtained in such a way that the client terminal 3 and the router 4 send and receive an ARP request message and an ARP response message.

The client terminal 3 receives via the IP network 2 the eighth packet corresponding to the response packet, which has been sent back from the load sharing target server (#1) 7.

[3] Fault Detecting/Recovering Process in Router

Next, a fault detecting/recovering (troubleshooting) process in the router 4 will be discussed referring to FIG. 13.

<Fault Detecting Process>

The router 4 periodically sends the ICMP-ECHO request message (packet) for confirming the communication based on ICMP (Internet Control Message Protocol) defined by RFC792 to the respective links (each existing for every IP address) accommodated in all the server load balancers (SLB#1 through #N) 5, and confirms the ICMP-ECHO response message as a response thereto.

The router 4 judges, if the server load balancer 5 accommodating even one link giving no response, that this server load balancer 5 has a fault. The router 4, when detecting the fault, executes a degenerating process of ruling out all the links to the server load balancer 5 with the fault detected from the load sharing target links.

Figure 13:
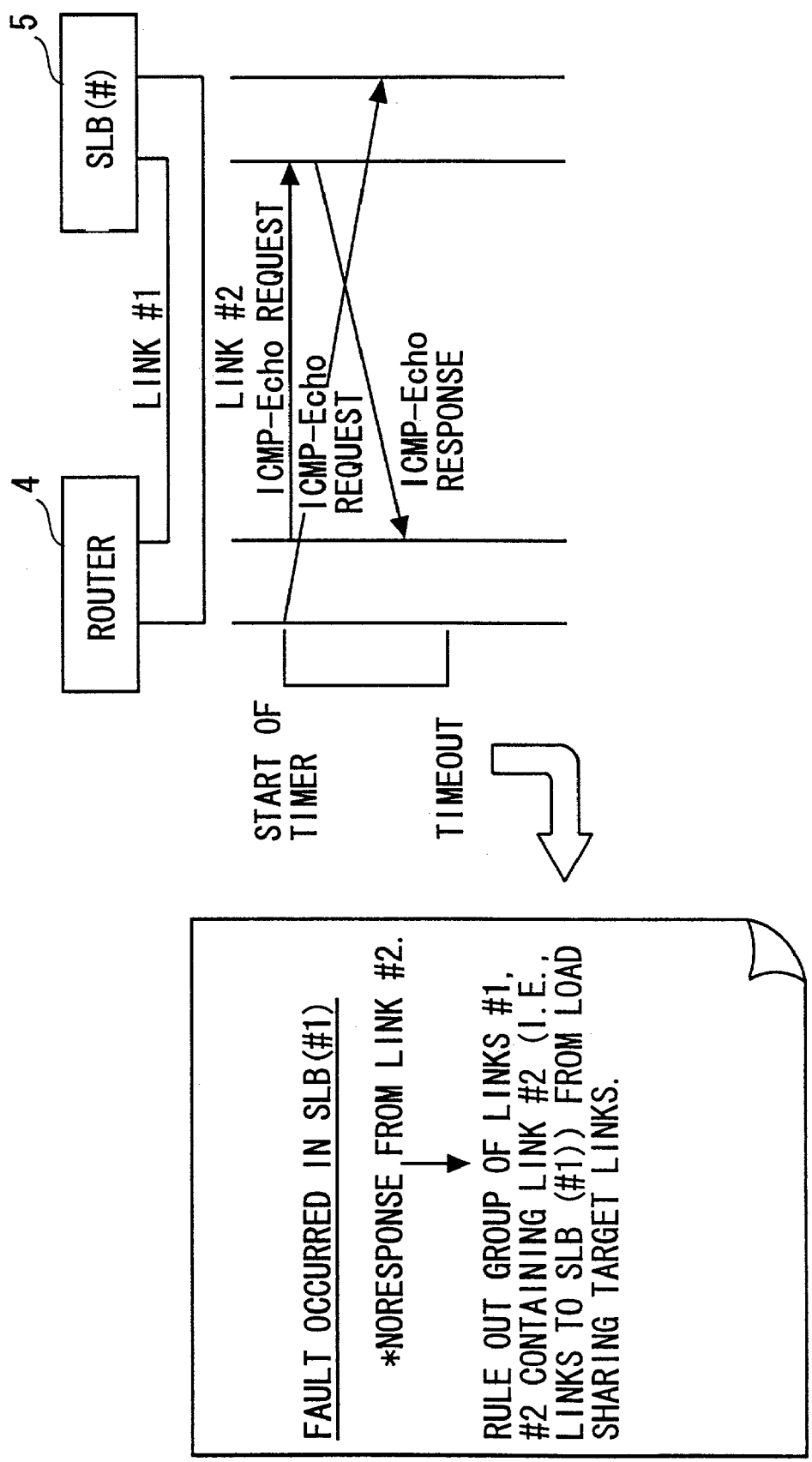
FIG. 13 is an explanatory diagram showing fault detecting/recovering processes in the router.

In an example shown in FIG. 13, the ICMP-ECHO response message is not sent back within a predetermined time from the link (#2) of the links (#1, #2) accommodated in the server load balancer (#1) 5, so that the route 4 rules out all the links (#1, #2) of the group to which the link (#2) belongs, from the load sharing target links. The links ruled out from the load sharing target links are managed in the table 48 retained by the link selecting module 47 shown in FIG. 5.

Note that the values of the IP addresses of the respective server load balancers 5 are predefined in the table 48. It is also predefined in the table 48 about which link belongs to which server load balancer 5.

<Fault Recovering Process>

The router 4, as in the case of the fault detecting process described above, periodically sends the ICMP-ECHO request message to the respective links accommodated in all the server load balancers 5 in order to confirm the communication, and confirms the ICMP-ECHO response message as a response thereto.

The router 4, when there are sent back the ICMP-ECHO response messages as responses from all the server-load-balancer-5-accommodated links including the links ruled out from the load sharing target links in the fault detecting process described above, judges that the server load balancer 5 and the links thereof are recovered, and executes a re-linking process of linking the recovered links back to the load sharing target links.

In this re-linking process, the links with their recoveries detected are registered again as the load sharing target links in the table 48, which is triggered immediately after detecting the recovery or by a manual input of the command from the administrator.

[4] Link Selecting Process in Regenerating/Recovering Processes in Router

Referring next to FIG. 14, a link selecting process (link selecting algorithm) in the regenerating/recovering processes in the router 4 will be explained. Note that a premise in this link selecting process is that three server load balancers (SLB#1, #2, #3) 5 exist.

When in a normal state, the router 4 establishes and allocates sessions S1, S4 to the first server load balance (#1) 5, sessions S2, S5 to the second server load balancer (#2) 5, and sessions S3, S6, S7 to the third server load balance (#3) 5, i.e., the router 4 is in a state of selecting the links.

Note that one session involves the use of two physical links for transferring the outgoing and loopback packets. A plurality of sessions to the same server load balancer 5 can be multiplexed on the same link.

The router 4, when detecting in the fault detecting process that a fault occurs in the link accommodated in the first server load balancer (#1) 5 in this state, relocates only the sessions S1, S4 established onto the first server load balancer (#1) 5 to the normal server load balancers (#2, #3) 5.

Namely, the sessions established onto the normal server load balancers (#2, #3) 5 remain unmoved. As a result, for example, the sessions S2, S5 and S1 are allocated to the second server load balancer (#2) 5, and the sessions S3, S6, S7 and S4 are allocated to the third server load balancer (#3) 5.

The regenerating process in this link selection is needed for gaining a continuity of the existing sessions. Namely, if the server load balancing process, though executed so far through the second server load balancer (#2), is then carried out through the different third server load balancer (#3) 5 halfway, the third server load balancer (#3) 5 recognizes this session as new one, and it follows that a destination server and a port number are determined based on the algorithm of the third server load balancer (#3) 5. Hence, there might be a possibility of being allocated to a server different from the server used so far.

As a result, an abnormal state occurs in the high-order application (application software), and the session is disconnected. Owing to the degenerating process in the link selection, however, the disconnection of the session can be avoided as much as possible.

The router 4, when detecting the recovery of the fault in the link accommodated in the firs server load balancer (#1) 5 in the fault recovering process, executes a process of returning the system back to the normal link selective state.

[Modified Example]

The server load sharing system 1 in embodiments discussed above individually includes the plurality of server load balancers (#1 through #N) each taking the architecture shown in FIG. 8. In the case of actually configuring the server load balancer 5, for instance, a plurality of NICs (Network Interface Cards) each implement the function of the server load balancer 5 and can be encased into the same device box body. Further, an individual card implements the function of the router 4 and can be encased together with the plurality of NICs each implementing the function of the server load balancer 5 into the same device box body.

The respective processes described in embodiments discussed above are provided as a program executable by a computer. This program can be recorded on a recording medium such as a CD-ROM, a floppy disk and others, and can also be distributed via communication lines.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A server load sharing system comprising:
(A) a plurality of server load balancers each accommodating at least first and second links, said balancer including:
(a) a module selecting, when receiving a forwarding target packet addressed to a predetermined virtual IP address via one of said first and second links, any one of a plurality of load sharing target servers specified in their group on the basis of this virtual IP address and each allocated a unique IP address; and
(b) a module rewriting the virtual IP address of the received forwarding target packet addressed to the virtual IP address into the unique IP address of said selected load sharing target server, and rewriting a source IP address of the received forwarding target packet addressed to the virtual IP address into an IP address capable of specifying the other of said first and second links; and
(B) a relay device connected to each of said plurality of server load balancers via said first and second links, further connected to each of said plurality of load sharing target servers via other links without directly connecting said plurality of server load balancers to said plurality of load sharing target servers, and separated from said plurality of server load balancers, said relay device including:

(c) a module identifying the received forwarding target packet addressed to the virtual IP address;

(d) a module selecting one of said first and second links for forwarding the identified forwarding target packet addressed to the virtual IP address to one of said plurality of server load balancers; and (e) a module forwarding the forwarding target packet, the forwarding target packet received via the other of said first and second links from a specific server load balancer that received the forwarding target packet addressed to the virtual IP address via one of said first and second links within said plurality of server load balancers to said selected load sharing target server, and forwarding the forwarding target packet sent back from said selected load sharing target server to said specific server load balancer via the other of said first and second links.

2. A server load sharing system according to claim 1, wherein said selecting module of said relay device selects one of said first and second links for forwarding the packet to any one of said plurality of server load balancers on the basis of a pseudo random number generated by applying a one-way function to a value of the source IP address contained in the identified forwarding target packet addressed to the virtual IP address.

3. A server load sharing system according to claim 1, wherein each of said server load balancers further includes a module rewriting, when receiving the forwarding target packet sent back from said selected load sharing target server via said relay device and the other of said first and second links, the unique IP address of said selected load sharing target server, which is contained in the received forwarding target packet, into the virtual IP address as a source IP address, and further the IP address capable of specifying the other of said first and second links, which is contained in the received forwarding target packet, into the source IP address as a destination IP address that has been contained in the forwarding target packet addressed to the virtual IP address, and making said relay device forward the packet via one of said first and second links.

4. A server load sharing system according to claim 1, wherein said relay device further includes a module setting said first and second links accommodated in each of said plurality of server load balancers into a group, periodically transmitting a monitoring packet to said first and second links of each group, and ruling out said first and second links as fault links belonging to the group containing the link with no response from selection target links.

5. A server load sharing system according to claim 4, wherein said relay device further includes a module setting, in the case of detecting a fault in said first and second links accommodated in each of said plurality of server load balancers, the forwarding target packet distributed to a normal server load balancer accommodating said first and second normal links in a way that keeps this distributed state, and changing the distributed state to said normal server load balancer with respect to only the forwarding target packet distributed to a fault server load balancer accommodating first and second fault links.

6. A server load sharing method in each of a plurality of server load balancers each accommodating at least first and second links, said method comprising:

(a) selecting, when receiving a forwarding target packet addressed to a predetermined virtual IP address via one of said first and second links, any one of a plurality of load sharing target servers specified in their group on the basis of this virtual IP address and each allocated a unique IP address; and (b) rewriting the virtual IP address of the received forwarding target packet addressed to the virtual IP address into the unique IP address of said selected load sharing target server, and rewriting a source IP address of the received forwarding target packet addressed to the virtual IP address into an IP address capable of specifying the other of said first and second links; and said method, in a relay device connected to each of said plurality of server load balancers via said first and second links, further connected to each of said plurality of load sharing target servers via other links without directly connecting said plurality of server load balancers to said plurality of load sharing target servers, and separated from said plurality of server load balancers, further comprising:

(c) identifying the received forwarding target packet addressed to the virtual IP address;

(d) selecting one of said first and second links for forwarding the identified forwarding target packet addressed to the virtual IP address to one of said plurality of server load balancers; and (e) forwarding the forwarding target packet, the forwarding packet target packet received via the other of said first and second links from a specific server load balancer that received the forwarding target packet addressed to the virtual IP address via one of said first and second links within said plurality of server load balancers to said selected load sharing target server, and forwarding the forwarding target packet sent back from said selected load sharing target server to said specific server load balancer via the other of said first and second links.

7. A server load sharing method according to claim 6, further comprising, in said relay device, selecting one of said first and second links for forwarding the packet to any one of said plurality of server load balancers on the basis of a pseudo random number generated by applying a one-way function to a value of the source IP address contained in the identified forwarding target packet addressed to the virtual IP address.

8. A server load sharing method according to claim 6, further comprising, in each of said server load balancers, rewriting, when receiving the forwarding target packet sent back from said selected load sharing target server via said relay device and the other of said first and second links, the unique IP address of said selected load sharing target server, which is contained in the received forwarding target packet, into the virtual IP address as a source IP address, and further the IP address capable of specifying the other of the first and second links, which is contained in the received forwarding target packet, into the source IP address as a destination IP address that has been contained in the forwarding target packet addressed to the virtual IP address, and making said relay device forward the packet via one of the first and second links.

9. A server load sharing method according to claim 6, further comprising, in said relay device, setting the first and second links accommodated in each of said plurality of server load balancers into a group, periodically transmitting a monitoring packet to the first and second links of each group, and ruling out the first and second links as fault links belonging to the group containing the link with no response from selection target links.

10. A server load sharing method according to claim 9, further comprising, in said relay device, setting, in the case of detecting a fault in the first and second links accommodated in each of said plurality of server load balancers, the forwarding target packet distributed to a normal server load balancer accommodating first and second normal links in a way that keeps this distributed state, and changing the distributed state to said normal server load balancer with respect to only the forwarding target packet distributed to a fault server load balancer accommodating first and second fault links.

11. A server load sharing system according to claim 1, wherein said plurality of server load balancers are provided as a plurality of components having server load balancing function and integrated within one device.

* * * * *